Patented Nov. 7, 1939

2,178,996

UNITED STATES PATENT OFFICE 2,178,996

SUSPENSION OF LIGHT-POLARIZING PARTICLES AND PROCESS OF MAKING SAME

Edwin H. Land, Boston, Mass., assignor, by mesne assignments, to Polaroid Corporation, Dover, Del., a corporation of Delaware No Drawing. Application March 16, 1936, Serial No. 69,134. Renewed March 9, 1939

11 Claims. (Cl. 252—6)

This invention relates to new and improved suspensions of minute light-polarizing particles and to the process of making the same.

The invention has for its object generally an improved suspension of colloid-like particles in a suitable suspending medium which may be preferably a solvent for a cellulosic compound, such for example as cellulose acetate, and the process of making the same.

A further object of the invention is to provide a suspension in a suitable medium of minute, colloid-like particles of needle-like shape which are strongly light-polarizing and which are extremely stable, the suspension being adapted for incorporation by mixing into a plastic mass, for example a mass of plastic cellulose acetate.

A still further object of the invention is to provide a short, easy and simple process for the manufacture of colloid-like particles of a light-polarizing crystal in a suitable suspending medium.

A still further object of the invention is the production of a light-polarizing compound, for example, a periodide of the sulphate of quinine or its related alkaloids, in the form of minute, colloid-like crystals from the reaction of suitable ingredients comprising ammonium iodide.

Other objects of the invention will in part be obvious and will in part appear hereinafter.

The invention accordingly comprises the several steps and the relation of one or more of such steps with respect to each of the others, and the article possessing the features, properties, and the relation of elements which are exemplified in the following detailed disclosure, and the scope of the application of which will be indicated in the claims.

In my issued Patent No. 1,951,664, dated March 20, 1934, there is disclosed a process for the manufacture of a periodide of a sulphate of an alkaloid of the related group comprising quinine, quinidine, cinchonine and cinchonidine in colloidal form. This invention contemplates a modification of the process disclosed in the said Letters Patent to the end that the process may be simplified with the production, furthermore, of a somewhat improved polarizing crystalline mass. The present invention contemplates, moreover, the production of the crystalline polarizing bodies in a suspending medium which is a solvent for cellulose acetate so that the colloid and the suspending medium may be mixed with a mass of dry cellulose acetate and the colloid dispersed therethrough. The cellulose acetate is rendered plastic by the addition of the solvent, whereby a dispersion of colloidal-like polarizing particles in plastic cellulose acetate may be obtained and from that dispersion transparent sheet-like polarizing areas produced.

An example of a suitable process embodying the present invention follows.

To 10 grams of quinine bisulphate, 170 c. c. of methly alcohol is added. The materials are at room temperature. The quinine bisulphate is caused to go into solution in the methyl alcohol by agitating or stirring and without the addition of heat. The solution may be termed "Solution A".

A second solution, which may be termed "Solution B", is then made by adding to a mixture of 4.1 grams of ammonium iodide and 1.7 grams of resublimed iodine crystals, 87 c. c. of methyl alcohol. The solution is made by agitating or stirring at room temperature without the addition of heat.

Where it is desired to incorporate the colloid-like crystals in cellulose acetate, 750 c. c. of ethyl acetate may be added to Solution B.

Solution A is then combined with the mixture of Solution B and the ethyl acetate and precipitation of minute crystals of a herapathite-like compound commences almost immediately. The mixture of Solutions A and B is stirred vigorously for a protracted period, which, with the quantities given may preferably be for from eight to ten minutes. It has been found that this continued stirring gives somewhat more stable crystals. At the end of the stirring period the mixture of the two solutions will be found to contain a mass of minute crystals which may settle slowly.

It is to be understood that while the proportions given for the various ingredients are preferred, they are not critical. Furthermore, other departures may be made from the preferred process described above without departing from the invention. For example, the sulphate of quinine, or its related alkaloid, may be employed under certain circumstances instead of the bisulphate, or other quinine compounds may be employed in lieu thereof.

It is to be noted that the process comprises the formation of two simple solutions and their combination without added heat at any stage. It is to be noted also that the resulting product possesses the light-polarizing properties and general characteristics of herapathite, but that the presence of the ammonium iodide in the ingredients employed results in a product which possesses certain advantages over other herapathite-like products from the standpoint of incorporation into the cellulose acetate suspending medium and the production of polarizing sheets therefrom. The crystals produced by the process of this invention are more stable than are the usual crystals of herapathite.

Where it is desired to employ the minute precipitated crystals in the formation of sheet-like polarizing material, the crystals and the mixture of solvents, i. e., methyl alcohol and ethyl acetate, may be introduced into a mass, for example 1¼ pounds of dry cellulose acetate, and thoroughly mixed therewith. The cellulose acetate becomes plasticized by the mixture of methyl alcohol and ethyl acetate, and as it becomes plastic the crystals of the polarizing substance are distributed through it. The mass of plastic cellulose acetate with the polarizing crystals incorporated therein may then be subjected to flow or extrusion or stretch, or rolling, so that the needle axes of the dispersed polarizing crystals may be oriented to substantial parallelism and a thin, sheet-like polarizing body produced.

It is to be understood that the addition of the ethyl acetate to the solution designated Solution B is made to provide a mixture of methyl alcohol and ethyl acetate which is especially desirable when the crystals and their suspending medium are incorporated with dry cellulose acetate, as this mixture of methyl alcohol and ethyl acetate renders plastic the cellulose acetate. It is to be understood that the invention may be practiced without the addition of the ethyl acetate to Solution B.

It is to be understood that in the formula given above the ingredients specified are chemically pure.

Since certain changes in carrying out the above process, and certain modifications in the article which embody the invention may be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. In a process of the character described for forming small crystals of a light-polarizing material from the related group of alkaloids consisting of quinine, quinidine, cinchonine and cinchonidine, the steps which comprise forming a solution of a sulphate of the alkaloid in alcohol and adding thereto ammonium iodide and iodine.

2. The process which comprises forming a solution of a sulphate of quinine in alcohol, forming a solution of ammonium iodide and iodine in alcohol, uniting the two solutions, and stirring.

3. The process which comprises forming a solution of a sulphate of one of the related group of alkaloids of which quinine, quinidine, cinchonine, and cinchonidine are members, incorporating therewith ammonium iodide and iodine, and stirring.

4. The process of forming a light-polarizing periodide which comprises forming a solution of quinine bisulphate in methyl alcohol, forming a solution of ammonium iodide and iodine in methyl alcohol, uniting the two solutions, and stirring.

5. The process of forming small crystals of a light-polarizing periodide which comprises forming a solution in alcohol of approximately two and one-half parts by weight of ammonium iodide and one part by weight of iodine, incorporating therewith a solution of a quinine sulphate in alcohol, and stirring.

6. In the process of forming small crystals of a light-polarizing material from a mixture of alcohol solutions comprising a quinine sulphate and iodine, the step which comprises incorporating therewith a solution comprising ammonium iodide.

7. In the process of manufacturing crystals of a light-polarizing substance, the steps which comprise forming a solution in alcohol of a mixture of iodine and ammonium iodide, and incorporating therewith a solution of a sulphate of quinine in alcohol.

8. The process of forming small crystals of a light-polarizing compound of quinine bisulphate and iodine which comprises preparing a solution of quinine bisulphate in methyl alcohol in the proportions of ten grams of quinine bisulphate to one hundred seventy cubic centimeters of methyl alcohol, preparing a second solution of ammonium iodide and iodine in methyl alcohol in the proportions of four and one-tenth grams of ammonium iodide and one and seven-tenths grams of iodine in eighty-seven cubic centimeters of methyl alcohol, uniting the two solutions, and stirring.

9. In the process of preparing a suspension of light-polarizing crystals in solvents of cellulose acetate, the steps which comprise uniting with a solution of ammonium iodide and iodine in methyl alcohol a quantity of ethyl acetate and an alkaloid sulphate of the related group consisting of quinine, quinidine, cinchonine and cinchonidine in methyl alcohol.

10. As a new article of manufacture, a dispersion of minute crystals comprising a sulphate of one of the related group of alkaloids consisting of quinine, quinidine, cinchonine and cinchonidine combined with ammonium iodide and iodine.

11. As a new article of manufacture, a dispersion of minute crystals comprising a sulphate of one of the related group of alkaloids consisting of quinine, quinidine, cinchonine and cinchonidine combined with ammonium iodide and iodine in a dispersion medium, the polarizing axes of the crystals being oriented to substantial parallelism.

EDWIN H. LAND.